US007699916B1

(12) United States Patent
Carter et al.

(10) Patent No.: US 7,699,916 B1
(45) Date of Patent: Apr. 20, 2010

(54) CORROSION-RESISTANT, ELECTRICALLY-CONDUCTIVE PLATE FOR USE IN A FUEL CELL STACK

(75) Inventors: J. David Carter, Bolingbrook, IL (US); Jennifer R. Mawdsley, Woodridge, IL (US); Suhas Niyogi, Woodridge, IL (US); Xiaoping Wang, Naperville, IL (US); Terry Cruse, Lisle, IL (US); Lilia Santos, Lombard, IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 83 days.

(21) Appl. No.: 12/128,022

(22) Filed: May 28, 2008

(51) Int. Cl.
*C09D 5/00* (2006.01)
*C09D 5/08* (2006.01)
*C09D 201/00* (2006.01)
*C09D 201/02* (2006.01)
*C09D 201/04* (2006.01)
*C09D 201/06* (2006.01)
*H01M 2/32* (2006.01)

(52) U.S. Cl. .............. 106/14.05; 106/14.44; 106/285; 106/287.19; 106/287.26; 429/34

(58) Field of Classification Search ............... 429/34
See application file for complete search history.

(56) References Cited

U.S. PATENT DOCUMENTS

| 6,749,959 | B2 * | 6/2004 | Nakata et al. ............... 429/34 |
| 6,869,718 | B2 * | 3/2005 | Yasuo et al. ............... 429/34 |
| 2007/0212589 | A1 * | 9/2007 | Kobuchi et al. ............ 429/38 |
| 2008/0014496 | A1 * | 1/2008 | Watanabe et al. ........... 429/129 |

* cited by examiner

*Primary Examiner*—Jerry Lorengo
*Assistant Examiner*—Jared Wood
(74) *Attorney, Agent, or Firm*—Michael J. Dobbs; Brian J. Lally; Paul A. Gottlieb (57) ABSTRACT

A corrosion resistant, electrically-conductive, durable plate at least partially coated with an anchor coating and a corrosion resistant coating. The corrosion resistant coating made of at least a polymer and a plurality of corrosion resistant particles each having a surface area between about 1-20 m$^2$/g and a diameter less than about 10 microns. Preferably, the plate is used as a bipolar plate in a proton exchange membrane (PEMFC) fuel cell stack.

19 Claims, 5 Drawing Sheets

CORROSION-RESISTANT, ELECTRICALLY-CONDUCTIVE PLATE FOR USE IN A FUEL CELL STACK

GOVERNMENT INTERESTS

The United States Government has rights in this invention pursuant to Contract No. W-31-109-ENG-38, between the U.S. Department of Energy (DOE) and the University of Chicago.

FIELD OF THE INVENTION

The present invention relates to a low-cost, durable, corrosion-resistant, electrically-conductive plate, preferably used as a bipolar plate in a fuel cell stack. One embodiment relates to a low-cost, durable, corrosion-resistant, electrically-conductive substitute for graphite, without the brittleness of graphite.

BACKGROUND OF THE INVENTION

Fuel cells are poised for future power generation, providing an efficient and clean alternative to current power sources, especially portable or on-site power generation. Polymer electrolyte membrane fuel cells (PEMFC) are especially equipped to power the automobiles of the future as they operate at low temperatures and have shown to have high power densities (over 2 kW/1 and 1 W/cm$^2$).

As a single fuel cell will generally not provide enough power for the efficient operation of automobiles or portable electronics, generally a plurality of fuel cells are stacked to aggregate their power generation. The fuel cells are each separated by a bipolar plate, which electrically connects the fuel cells together, combining their power output, while also allowing the reaction gases and reaction products to pass to and from the fuel cells. U.S. Pat. No. 4,175,165, hereby fully incorporated by reference, describes one example of bipolar plates used in a fuel cell stack. Bipolar plates allow multiple fuel cells to be stacked together, aggregating their power, in a compact efficient design, minimizing size and electrical resistance across the fuel cell stack.

Bipolar plates in a fuel cell stack provide structured surfaces to guide reaction gases and reaction products through defined channels as they enter and leave the fuel cells while also electrically connecting the fuel cells. These bipolar plates therefore need to be gas impermeable, electrically-conductive, corrosion resistant, light-weight, strong, flexible and economical to manufacture. In particular, bipolar plates must withstand the corrosive effects of the cathodes of adjacent fuel cells, the corrosive nature of the reaction gases and reaction products (humidity), any heat transfer fluids used to cool the fuel cell stack, and combinations thereof.

Bipolar plates used today generally use machined graphite plates, that are electrically-conductive, corrosion resistant and gas impermeable. Unfortunately, graphite plates are expensive, inflexible and succumb to brittle fracture. Attempts have been made to use lower cost and more durable metals such as stainless steels, aluminum, nickel, titanium and other alloys, which can be made gas impermeable. However, these materials are susceptible to severe corrosion due to the acidic conditions of fuel cells, such as PEMFCs.

Some attempts have been made to provide metallurgical coatings to protect the base metals, but these have proven to be costly and time consuming. Recently, there have been efforts to develop a bipolar plate out of polymer-composites, however these polymer-composite plates do not have sufficient gas impermeability, nor do they provided suitable electrical conductivity. Furthermore, polymer-composite bipolar plates are prone to failure at temperatures over 80° C.

Therefore, there exists a need for a gas impermeable, electrically-conductive, corrosion resistant, light-weight, strong, flexible and low cost material for use in applications such as bipolar plates for fuel cell stacks.

SUMMARY OF THE INVENTION

An electrically-conductive, durable, low-cost, corrosion resistant plate made of a metal substrate at least partially coated by an anchor coating and a corrosion resistant coating, whereby the anchor coating is between and connected to the metal substrate and the corrosion resistant coating.

The corrosion resistant layer is made of a polymer and a plurality of corrosion resistant particles preferably each having a surface area between about 1-20 m$^2$ g$^{-1}$ and a diameter less than about 10 microns. The polymer and the corrosion resistant particles of the corrosion resistant coating are made of one or more materials resistant to one or more corrosive fluids or solids. Preferably, the metal substrate has a shape and dimensions optimized for the desired use. In a preferred embodiment, the plate is a bipolar plate for a fuel cell, preferably a PEMFC (polymer electrolyte fuel cell), whereby the metal substrate provides support and electrical conductivity for the bipolar plate.

It is an object of one embodiment of the present invention for a gas impermeable, electrically-conductive corrosion resistant, light-weight, strong, flexible and low cost plate.

It is an object of one embodiment of the present invention for a gas impermeable, electrically-conductive corrosion resistant, light-weight, strong, flexible and low cost bipolar plate for use in a fuel cell stack.

It is an object of one embodiment of the present invention for a gas impermeable, electrically-conductive corrosion resistant, light-weight, strong, flexible and low cost bipolar plate for use in a PEFC (polymer electrolyte fuel cell) stack.

DETAILED DESCRIPTION OF THE INVENTION

An electrically-conductive, durable, low-cost, corrosion resistant plate made of a metal substrate at least partially coated by an anchor coating and a corrosion resistant coating, whereby the anchor coating is between and connected to the metal substrate and the corrosion resistant coating.

The corrosion resistant layer is made of a polymer and a plurality of corrosion resistant particles preferably each having a surface area between about 1-20 m$^2$g$^{-1}$ and a diameter less than about 10 microns. The polymer and the corrosion resistant particles of the corrosion resistant coating are made of one or more materials resistant to one or more corrosive fluids or solids. Preferably, the metal substrate has a shape and dimensions optimized for the desired use. In a preferred embodiment, the plate is a bipolar plate for a fuel cell, preferably a PEMFC (polymer electrolyte fuel cell), whereby the metal substrate provides support and electrical conductivity for the bipolar plate.

Figure 1:
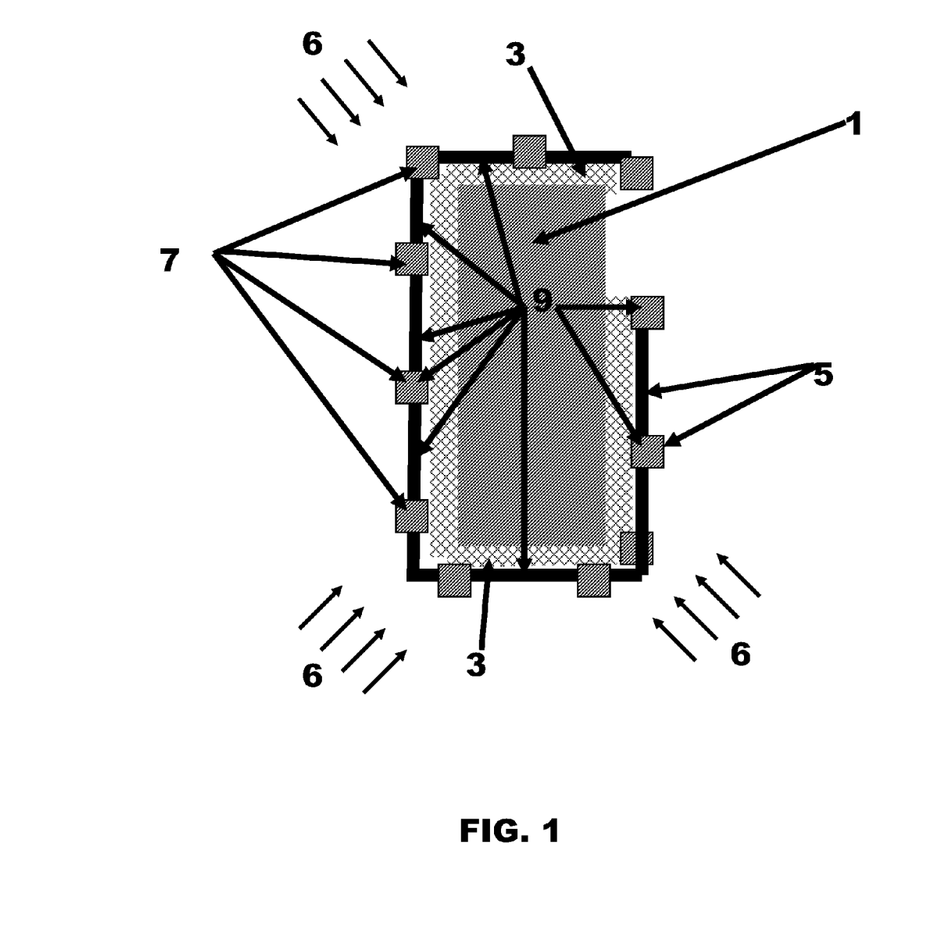
FIG. 1 depicts a side view of one embodiment of an electrically-conductive, corrosion resistant plate.

FIG. 1

FIG. 1 depicts one embodiment of a plate having a metal substrate 1 at least partially coated with an anchor coating 3 and a corrosion resistant coating 5. The anchor coating 3 at least partially coats the metal substrate 1. Likewise, the corrosion resistant coating 5 at least partially coats the anchor coating 3. Preferably, the anchor coating 3 coats the entire metal substrate 1 and the corrosion resistant coating 5 coats the entire anchor coating 3. The anchor coating 3 therefore physically connects the corrosion resistant coating 5 to the metal substrate 1. Preferably, the corrosion resistant coating 5 is eventually exposed to one or more corrosive fluids or solids 6.

The corrosion resistant coating 5 has a plurality of corrosion resistant particles 7 intermixed with a corrosion resistant polymer 9. Preferably, the corrosion resistant particles 7 are electrically-conductive and selected for the desired properties of the plate. For example, conductivity may be altered by using various corrosion resistant particles, polymers, or altering their respective amounts. Furthermore, corrosion resistance is also preferably selected for the anticipated exposure of the plate (e.g. the one or more corrosive fluids or solids 6).

One or More Corrosive Fluids or Solids 6

The one or more corrosive fluids or solids 6 cause corrosion, preferably in metals such as the metal substrate 1. Examples of corrosive fluids or solids 6 include, but are not limited to, acids, sulfonic acid $HSO_3$—R (0.5 M $H_2SO_4$), hydrated polyperfluorosulfonic acid polymer, water, oxygen, hydrogen and combinations thereof.

Metal Substrate 1

The metal substrate 1 is an electrically-conductive metal. Preferably, the metal substrate 1 is durable and flexible. The metal substrate 1 is preferably made of iron, carbon, aluminum, nickel, titanium, chromium, steel, alloys thereof and combinations thereof. In a preferred embodiment, the metal substrate 1 is stainless steal, preferably 430 stainless steal or more preferably 316 stainless steal. Preferably, the metal substrate 1 has a shape and dimensions optimized for the desired use of the plate. In a preferred embodiment, the plate is a bipolar plate for a PEMFC and the metal substrate 1 provides support and electrical conductivity for the bipolar plate. In a preferred embodiment, the metal substrate 1 is at least 1 mm thick and the coatings (the anchor coating 3 and the corrosion resistant coating 5) are less than 300 microns total.

Anchor Coating 3

The anchor coating 3 bonds the metal substrate 1 to the corrosion resistant coating 5. Preferably, the anchor coating 3 is an epoxy compound. More preferably, the anchor coating 3 contains an α, ω hydroxo-epoxy compound, fluoro-polymer and combinations thereof. In a preferred embodiment, the anchor is TFHP [(2-[2,2,2-Trifluoro-1-(4-{2-hydroxy-3-[4-(4-oxiranylmethoxy-benzyl)-phenoxy]-propoxy}-phenyl)-1-trifluoromethyl-ethyl]-phenol], TFHP [(4-[2,2,2-Trifluoro-1-(4-{2-hydroxy-3-[4-(4-oxiranylmethoxy-benzyl)-phenoxy]-propoxy}-phenyl)-1-trifluoromethyl-ethyl]-phenol], or TFHP [(6-[2,2,2-Trifluoro-1-(4-{2-hydroxy-3-[4-(4-oxiranylmethoxy-benzyl)-phenoxy]-propoxy}-phenyl)-1-trifluoromethyl-ethyl]-phenol].

Preferably, the anchor coating 3 has the proper chemical functionalities for bonding the metal substrate 1 to the corrosion resistant coating 5 for the environment the metal substrate 1, anchor coating 3 and corrosion resistant coating 5 will be exposed to, for example temperature, the one or more corrosive fluids or solids 6, physical forces (sheer, tensile, etc. . . . ), etc. . . . In a preferred embodiment, the anchor coating 3 uniformly coats the metal substrate 1 and is less than 10 microns thick. More preferably, the anchor coating 3 is a monolayer coating the metal substrate 1. Preferably, the anchor coating 3 completely coats the metal substrate 1.

Preferably, the anchor coating 3 is a monolayer completely wrapping around the metal substrate 1. The anchor coating 3 may be a single polymer fiber wrapped around the metal substrate 1 or may be a plurality of fibers in various configurations. For example, in one embodiment a plurality of polymer fibers each run along the surface of the metal substrate 1, whereby the metal substrate 1 and the corrosion resistant coating 5 are connected to each polymer fiber at various points. In another embodiment, each polymer fiber runs tangential to the surface of the metal substrate 1 having one end connected to the metal substrate 1 and another end connected to the corrosion resistant coating 5. Preferably, the anchor coating 3 is design and configured for maximum bonding between the metal substrate 1 and the corrosion resistant coating 5. In a preferred embodiment, the anchor coating 3 is also optimized for electrical conductivity across the plate.

The anchor coating 3 may be deposited onto the metal substrate 1 using any means known in the art. Preferably, the anchor coating 3 is uniformly deposited onto the metal substrate 1. Preferably, the anchor coating 3 is deposited by atomic layer deposition (ALD), chemical vapor deposition (CVD) or more preferably by, electro-static sprayed, dipping, spray or chemical reaction. In one embodiment, the anchor coating 3 is applied to the metal substrate 1 by dip coating the anchor coating 3 onto the metal substrate 1. In a preferred embodiment, the anchor coating 3 is electrostatic-sprayed onto the metal substrate 1.

Corrosion Resistant Coating 5

The corrosion resistant coating 5 is made of a plurality of corrosion resistant particles 7 and a polymer 9. Preferably, the corrosion resistant coating 5 is less than 0.30 mm thick. More preferably the corrosion resistant coating 5 is about 0.15 mm thick. However other thickness may be used for example, in one embodiment, the corrosion resistant coating 5 is about 0.04 mm thick. Preferably, the corrosion resistant coating 5 completely coats the anchor coating 3. More preferably, the anchor coating 3 completely coats the metal substrate 1 and the corrosion resistant coating 5 completely coats the anchor coating 3.

Preferably, the corrosion resistant coating 5 is uniformly deposited onto the metal substrate 1. Preferably, the corrosion resistant coating 5 is deposited by chemical vapor deposition (CVD), electro-static spraying, dipping, wet spraying, or by a chemical reaction.

The corrosion resistant particles 7 are any electrically-conductive particles resistant to the one or more corrosive fluids or solids 6. The corrosion resistant particles 7 preferably are carbides, nitrides, borides and silicides, carbon (nanotubes, fibers, threads, cloth, foam), diamond, graphite, NbC, TaC, ZrC, TiC, NbB2, MoB, $MgB_{12}$, $BaB_6$, $GdB_4$, $W_2B_5$, $ZrB_{12}$, $YB_{12}$, $LaB_6$, $CaB_6$, $TaB_2$, $TiB_2$, $ZrB_2$, TaN, ZrN, TiN, NbN, $CoSi_2$, $Mo_5Si_3$, $MoSi_2$, $TiSi_2$, $WSi_2$, $ZrSi_2$, $NbSi_2$, $Nb_5Si_3$, $FeSi_2$, or combinations thereof. Preferably, the corrosion resistive particles 7 make up about 10 to 90, more preferably about 50-70 weight percent of the corrosion resistant coating. Preferably, each of the corrosion resistant particles 7 has a surface area between about 1-20 $m^2$ $g^{-1}$ and a diameter less than about 10 microns. In a preferred embodiment, the corrosion resistant coating 5 has about 60 percent graphite by weight.

Preferably, the corrosion resistant coating 5 is made by grinding a polymer into a fine powder and blending the corrosion resistant particles 7, creating corrosion resistant coating precursor. The precursor is then preferably compressed and heated creating a film. The film is then laminated onto the anchor coating 3 of the metal substrate 1. In a preferred embodiment, the precursor is compressed at a temperature about 250° C. and 5,000-10,000 psi and subsequently laminated onto the anchor coating 3 at 225° C. and 100 psi. More preferably, the corrosion resistant coating 5 is electro-statically sprayed onto the anchor coating 3.

The corrosion resistant polymer 9 is resistant to the one or more corrosive fluids or solids 6 while also capable of bonding to the corrosion resistant particles 7. The corrosion resistant polymer 9 is preferably poly(chlorotrifluoroethylene-co-vinylidene fluoride) PCTFE, poly (chlorotrifluoroethylene), poly(ethylene-alt-chlorotrifluoroethylene) ECTFE, polyetheretherketones (PEEK), aromatic polysulfones, or combinations thereof.

Figure 2:
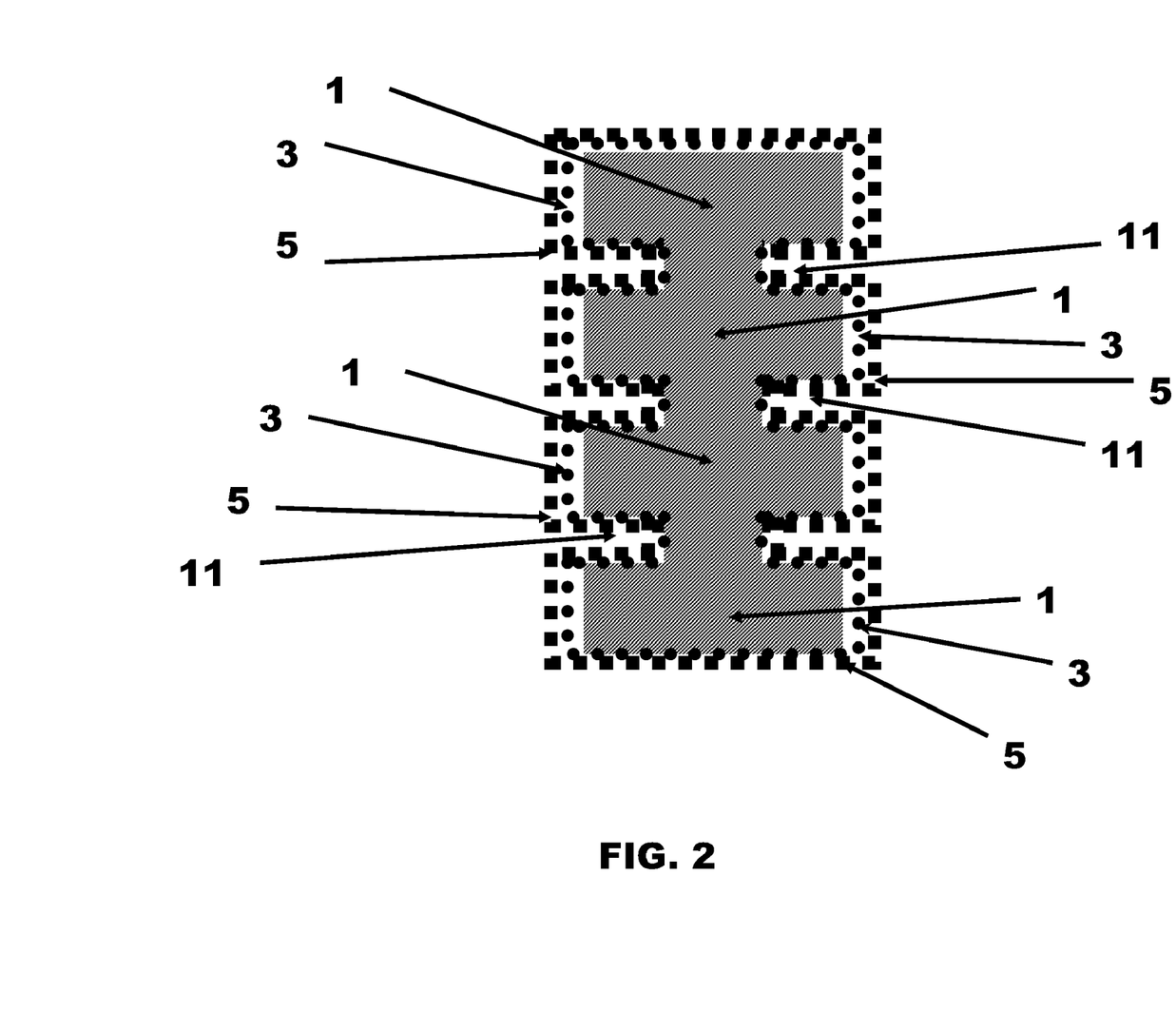
FIG. 2 depicts a side view of one embodiment of an electrically-conductive, corrosion resistant plate having one or more channels.
Figure 3:
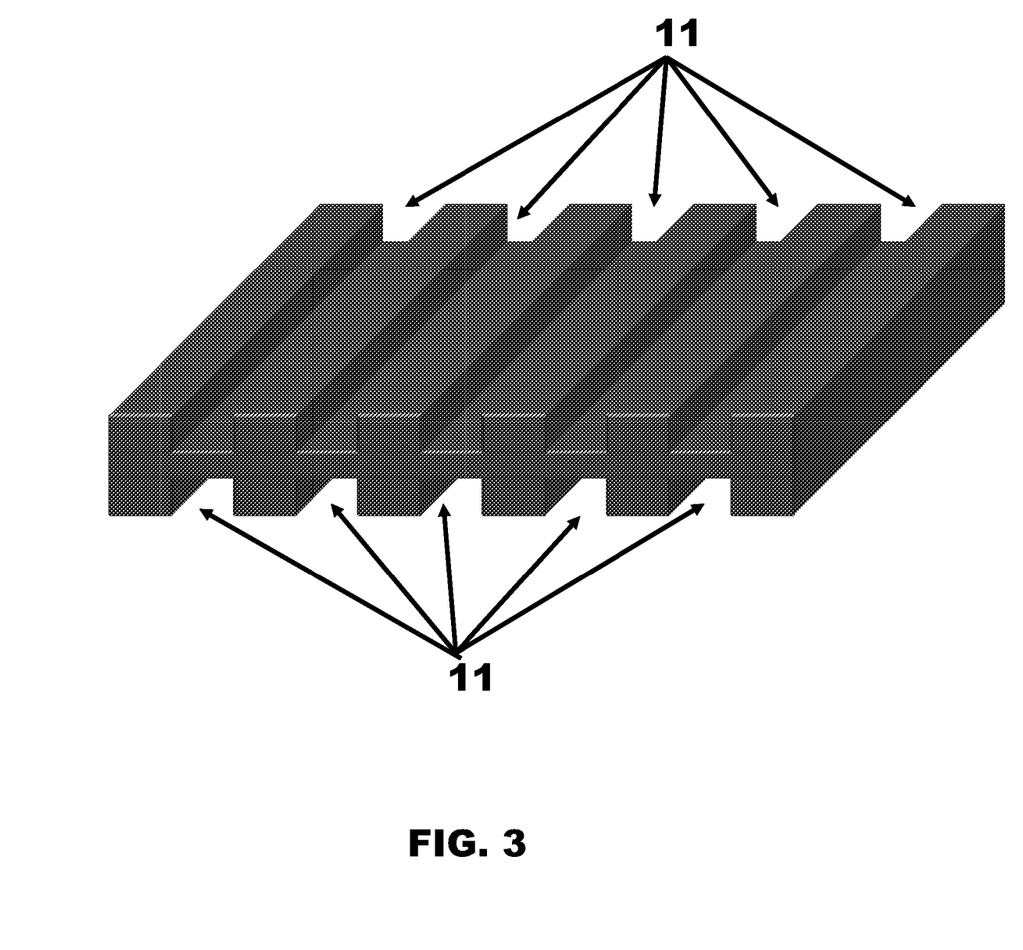
FIG. 3 depicts a perspective view of one embodiment of an electrically-conductive, corrosion resistant plate having one or more channels.

FIG. 2 and FIG. 3

FIG. 2 depicts the side view and a FIG. 3 depicts a perspective view of one embodiment of a plate having one or more channels 11. Similar to the embodiment shown in FIG. 1, FIG. 2 depicts an embodiment having a metal substrate 1 coated with an anchor coating 3, which is coated with a corrosion resistant coating 5. However, in this embodiment one or more channels 11 recess into the metal substrate 1, preferably passing one or more corrosive fluids or solids 6, while the metal substrate 1 is protected by the corrosion resistant coating 5. As in the embodiment shown in FIG. 1, the anchor coating 3 is connected to both metal substrate 1 and the corrosion resistant coating 5.

One or More Channels 11

The one or more channels 11 each allow a fluid or solid, preferably the corrosive fluid or solid 6, to pass along the plate while maintaining the corrosion resistivity of the plate. Therefore, the interior of each of the channels 11 is first at least partially coated with an anchor coating 3. Likewise the anchor coating 3 of the each channel is also coated with a corrosion resistant coating 5, whereby the anchor coating 3 is between and connected to the metal substrate 1 and the corrosion resistant coating 5. Preferably, each channel 11 is completed coated with an anchor coating 3 and a corrosion resistant coating 5.

In a preferred embodiment, the plate is a bipolar plate of a fuel cell stack and reaction gases and reaction product gases are passed through the channels 11 of the bipolar plate for fuel cell operation. Preferably, the reaction gases and reaction product gases have at least hydrogen, oxygen and $H_2O$. The one or more channels 11 may also be used in other applications, for example to channel corrosive heat transfer fluids, such as salt water, petrochemicals, acids, ethylene glycol, alcohols, etc. . . . Preferably, the one or more channels 11 each run along an axis about parallel to each other whereby the plate can separate two objects providing electrical conductivity and durability, while maintaining corrosion resistivity.

In the alternative, the one or more channels 11 may have various shapes and sizes. For example, the one or more channels 11 may pass one or more corrosive fluids or solids 6 (e.g. heat transfer fluids, such as salt water, petrochemicals, acids, ethylene glycol, alcohols, etc) . . . to any number of objects. For example, in one embodiment, the one or more channels 11 distribute various fluids across any number of devices.

Figure 4:
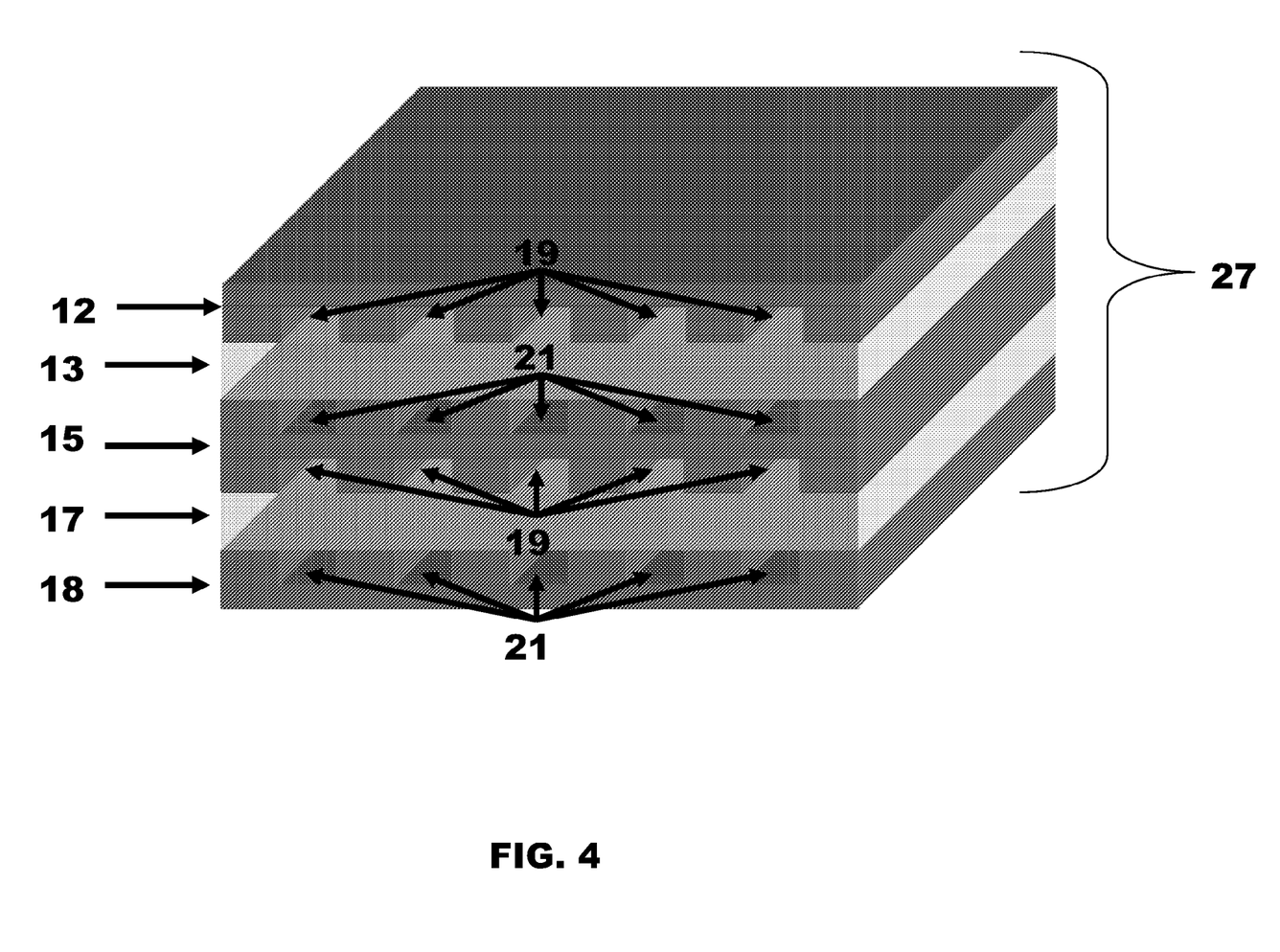
FIG. 4 depicts a perspective view of a preferred use of the plate in a fuel cell stack having two fuel cells.

FIG. 4

FIG. 4 depicts a preferred embodiment utilizing the embodiment shown in FIG. 2 and FIG. 3 in a fuel cell stack 27. In this embodiment, a first plate 15 connects a first fuel cell 13 and a second fuel cell 17 to aggregate the power produced by the first fuel cell 13 and the second fuel cell 17. The first fuel cell 13 and second fuel cell 17 preferably contains a polymer electrolyte membrane, which is composed of a hydrated polyperfluorosulfonic acid polymer (e.g. Nafion®). A top plate 12 and a bottom plate 18, each having an anchor coating and a corrosion resistant coating, provide an electrical connection for the fuel cell stack 27. For example, the anode of the first fuel cell 13 may be connected by the first plate 15 to the cathode of the second fuel cell 17 or vice-versa.

Preferably, the top plate 12, the first fuel cell 13, the second fuel cell 17 and the bottom plate 18 are the embodiment shown in FIG. 2 and FIG. 3 having a metal substrate 1, an anchor coating 3, a corrosion resistant coating 5 and one or more channels 11. Preferably, the one or more channels 11 for both the top plate 12 and the bottom plate 18 are on the same side whereby the top of the top plate 12 is flat and the bottom of the bottom plate 18 is flat. Therefore, the fuel cell stack 27 having a flat top and bottom can be easily electrically connected as a power source, while also providing one or more channels 11 to supply fuel to and from the individual fuel cells.

A first channel 19 and a second channel 21 pass through the top plate 12, first plate 15 and bottom plate 18 at opposite ends. The first channel 19 and the second channel 21 allow one or more corrosive fluids or solids to pass to and from the first fuel cell 13 and the second fuel cell 17. The first channel 19 and the second channel 21 allow one or more corrosive fluids or solids to preferably power the first fuel cell 13 and the second fuel cell 17. Preferably, the first channel 19 contains a corrosive fluid containing hydrogen and the second channel 21 contains a corrosive fluid containing oxygen and water. In the alternative, the second channel 21 may contain a corrosive fluids or solids containing hydrogen and the first channel 19 may contain one or more corrosive fluids or solids containing oxygen and water.

Figure 5:
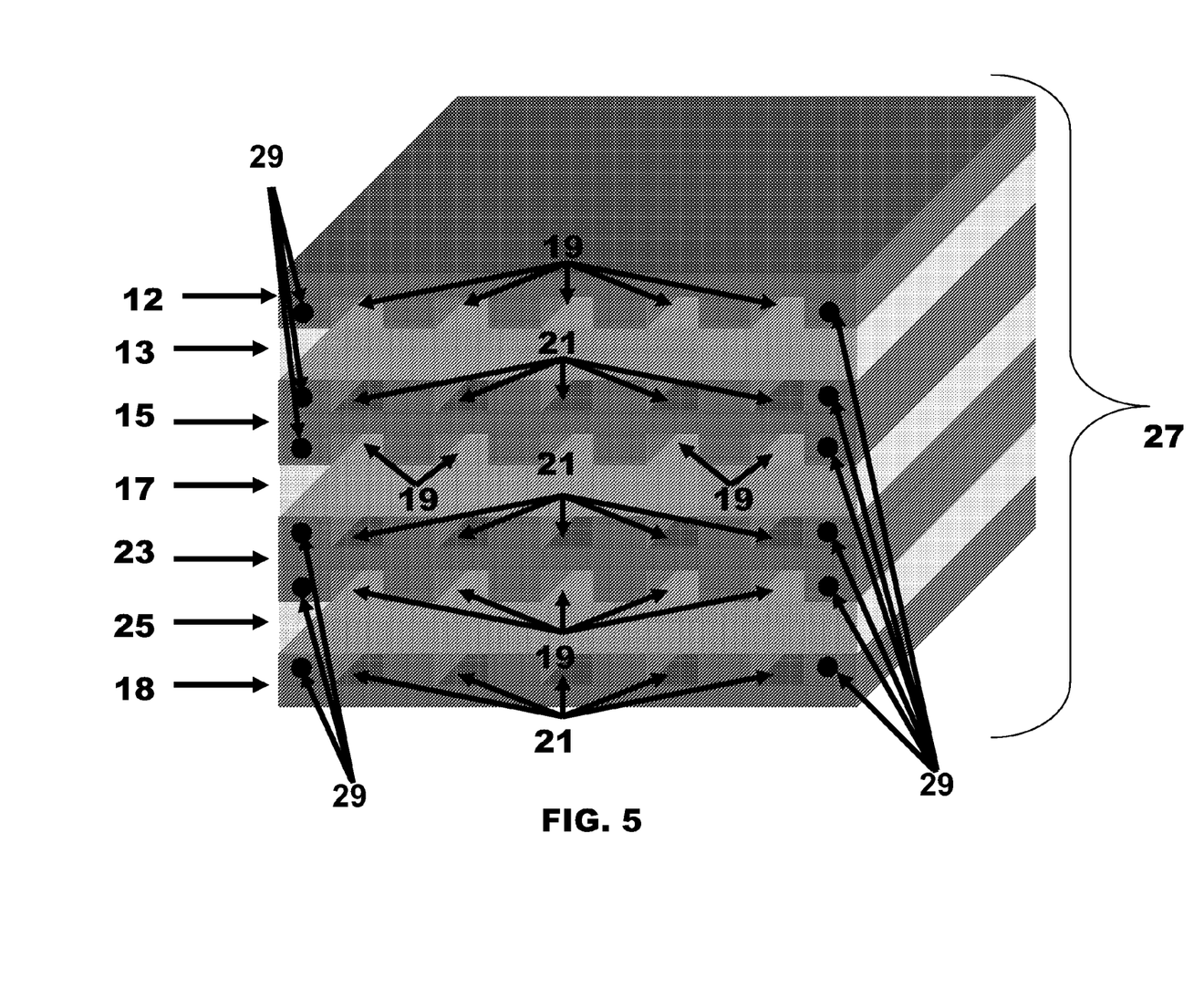
FIG. 5 depicts a perspective view of a preferred use of the plate in a fuel cell stack having three fuel cells.

FIG. 5

FIG. 5 depicts a preferred embodiment utilizing the embodiment shown in FIG. 2 and FIG. 3 in a fuel cell stack 27. In this embodiment, the first plate 15 connects a first fuel cell 13 to a second fuel cell 17; and a second plate 23 connects the second fuel cell 17 to a third fuel cell 25 to aggregate the power produced by the first fuel cell 13, the second fuel cell 17 and the third fuel cell 25. For example, in one embodiment, the anode of the first fuel cell 13 is connected by the first plate 15 to the cathode of the second fuel cell 17, which is connected to the anode of the third fuel cell 25 by the second plate 23.

In another embodiment, the cathode of the first fuel cell 13 is connected by the first plate 15 to the anode of the second fuel cell 17, which is connected to the cathode of the third fuel cell 25 by the second plate 25. Other fuel cell stack configurations may also be used. Preferably, a top plate 12 and a bottom plate 18 are used as in FIG. 4 to provide an electrical connection for the fuel cell stack 27, while also providing one or more channels 11 to supply fuel, preferably one or more corrosive fluids 6 to or from the fuel cells.

The first channel 19 and the second channel 21 preferably supply fuel and fuel cell reaction gases and reaction products to and from the fuel cells (first fuel cell 13, second fuel cell 17 and third fuel cell 25), preferably a stack of polymer electrolyte fuel cells (PEMFC). Preferably, a first supply stream comprising hydrogen is passed through the first channel 19 and a second supply stream comprising oxygen is passed through the second channel 21. Preferably the plates are exposed to temperatures less than 250° C. Other fuel cell stack configurations may also be used, such as tubular or cylindrical stack configurations. In one embodiment, one or more of the embodiments shown in FIG. 1 and FIG. 2 are used in a tubular fuel cells stack such as the one described in U.S. Pat. No. 3,402,230, hereby fully incorporated by reference.

Preferably, a third channel 29 passes a heat transfer fluid through the top plate 12, first fuel cell 13, the first plate 15, the second fuel cell 17, the second plate 23, the third fuel cell 25, the bottom plate 18 or a combination thereof to maintain the fuel cell stack 27 at an optimal temperature. Preferably, the heat transfer fluid is salt water, petrochemicals, acids, ethylene glycol, alcohols, etc. . . .

First Fuel Cell 13, Second Fuel Cell 17 and Third Fuel Cell 25

The fuel cells (first fuel cell 13, second fuel cell 17 and third fuel cell 25) are each an electrochemical energy conversion device. The first fuel cell 13, second fuel cell 17 and third fuel cell 25 each produce electricity from various quantities of fuel supplied by the first channel 19, the second channel 21 or a combination thereof. Preferably the first fuel cell 13, second fuel cell 17 and third fuel cell 25 each have an anode and a cathode separated by an electrolyte. Preferably, each anode of the first fuel cell 13, second fuel cell 17 and third fuel cell 25 is fueled by the first channel 19 and each cathode is fueled by the second channel 21 or vice-versa. Preferably, the first fuel cell 13, second fuel cell 17 and third fuel cell 25 are each a Polymer Electrolyte Membrane (PEMFC), Phosphoric Acid, Direct Methanol, Alkaline or Regenerative (Reversible) fuel cell.

Preferably, the first fuel cell 13, second fuel cell 17 and third fuel cell 25 are each corrosive to the metal substrate 1 of each plate (top plate 19, first plate 15, second plate 23 and bottom plate 18). However, the metal substrate 1 of each plate (top plate 19, first plate 15, second plate 23 and bottom plate 18) is protected from the corrosive effects of the fuel cells by their respective corrosion resistant coating 5, while also being electrically conductive as to aggregate the power output of the fuel cells.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

The invention claimed is:

1. A device comprising:
   a. one or more plates each comprising a metal substrate;
   b. each said metal substrate comprising:
      i. an anchor coating at least partially coating said metal substrate;
      ii. said anchor coating comprising a bonding means for bonding with said metal substrate;
      iii. said anchor coating at least partially coated with a corrosion resistant coating whereby said anchor coating is between and connected to said metal substrate and said corrosion resistant coating;
      iv. said anchor coating comprising a bonding means for bonding with said corrosion resistant coating;
      v. said anchor coating comprising [4-[2,2,2-Trifluoro-1-(4-{2-hydroxy-3-[4-(4-(4-oxiranylmethoxy-benzyl)-phenoxy]-propoxy}-phenyl)-1-trifluoromethyl-ethyl]-phenol], and;
      vi. said corrosion resistant coating comprising a polymer and a plurality of corrosion resistant particles; and
      vii. each said corrosion resistant particles electrically-conductive and having a surface area between about 1-20 m$^2$/g and a diameter less than about 10 microns.

2. The device of claim 1 whereby each metal substrate further comprises:
   a. one or more channels recessing into said metal substrate;
   b. each said channel having an interior;
   c. said anchor coating of said metal substrate completely coating said interior of each said channel; and
   d. said corrosion resistant coating completely coating said anchor coating within said interior of each channel, whereby said anchor coating is between and connected to said interior of each channel and said corrosion resistant coating.

3. The device of claim 2 further comprising:
   a. a first fuel cell;
   b. a second fuel cell;
   c. a first plate from said one or more plates;
   d. said first fuel cell corrosive to said metal substrate of said first plate;
   e. said second fuel cell corrosive to said metal substrate of said first plate;
   f. said first plate positioned between and connected to said first fuel cell and said second fuel cell;
   g. one or more of said channels of said first plate passing a second corrosive fluid to or from said first fuel cell; and
   h. one or more of said channels of said first plate passing a first corrosive fluid to or from said second fuel cell.

4. The device of claim 1 whereby:
   a. each said corrosion resistant particle comprises a corrosion resistant particle from the group of corrosion resistant particles consisting of carbides, nitrides, borides and silicides, carbon, diamond, graphite, NbC, TaC, ZrC, TiC, NbB$_2$, MoB, MgB$_{12}$, BaB$_6$, GdB$_4$, W$_2$B$_5$, ZrB$_{12}$, YB$_{12}$, LaB$_6$, CaB$_6$, TaB$_2$, TiB$_2$, ZrB$_2$, TaN, ZrN, TiN, NbN, CoSi$_2$, Mo$_5$Si$_3$, MoSi$_2$, TiSi$_2$, WSi$_2$, ZrSi$_2$, NbSi$_2$, Nb$_5$Si$_3$, FeSi$_2$ and combinations thereof; and
   b. each said polymer of said corrosion resistant coating comprises a polymer from the group of polymers consisting of poly(chlorotrifluoroethylene-co-vinylidene fluoride, PCTFE, poly(chlorotrifluorethylene), poly(ethylene-alt-chlorotrifluoroethylene, polyetheretherketones (PEEK), aromatic polysulfones and combinations thereof.

5. The device of claim 1 whereby each said corrosion resistant coating comprises between about 10 to 90 weight percent of said corrosion resistant particles.

6. The device of claim 1 whereby each said corrosion resistant coating comprises between about 50 to 70 weight percent of said corrosion resistant particles.

7. The device of claim 1 whereby each said metal substrate is made of a material comprising a metal from the group of metals consisting of iron, carbon, aluminum, nickel, titanium, chromium, steel, alloys thereof and combinations thereof.

8. The device of claim 1 whereby said each metal substrate is made of a material comprising stainless steel.

9. The device of claim 1 whereby:
   a. each said metal substrate is made of a material comprising 316 stainless steel; and
   b. each said corrosion resistant coating comprises about 60 weight percent of graphite.

10. The device of claim 3 further comprising:
    a. said one or more plates further comprising a top plate and a bottom plate;
    b. one or more of said channels of said top plate passing said first corrosive fluid to or from said first fuel cell; and
    c. one or more of said channels of said bottom plate passing said second corrosive fluid to or from said second fuel cell.

11. The device of claim 10 whereby:
    a. each said corrosion resistant particle comprises a corrosion resistant particle from the group of corrosion resistant particles consisting of carbides, nitrides, borides and silicides, carbon, diamond, graphite, NbC, TaC, ZrC, TiC, $NbB_2$, MoB, $MgB_{12}$, $BaB_6$, $GdB_4$, $W_2B_5$, $ZrB_{12}$, $YB_{12}$, $LaB_6$, $CaB_6$, $TaB_2$, $TiB_2$, $ZrB_2$, TaN, ZrN, TiN, NbN, $CoSi_2$, $Mo_6Si_3$, $MoSi_2$, $TiSi_2$, $WSi_2$, $ZrSi_2$, $NbSi_2$, $Nb_5Si_3$, $FeSi_2$ and combinations thereof; and
    b. each said polymer of said corrosion resistant coating comprises a polymer from the group of polymers consisting of poly(chlorotrifluoroethylene-co-vinylidene fluoride, PCTFE, poly(chlorotrifluoroethylene), poly (ethylene-alt-chlorotrifluoroethylene, polyetheretherketones (PEEK), aromatic polysulfones and combinations thereof.

12. The device of claim 11 whereby each said corrosion resistant coating comprises between about 10 to 90 weight percent of said corrosion resistant particles.

13. The device of claim 12 whereby each said metal substrate is made of a material comprising a metal from the group of metals consisting of iron, carbon, aluminum, nickel, titanium, chromium, steel, alloys thereof and combinations thereof.

14. The device of claim 12 whereby each said metal substrate is made of a material comprising stainless steel.

15. The device of claim 14 whereby:
    a. said anchor coating completely coats said metal substrate; and
    b. said corrosion resistant coating completely coats said anchor coating.

16. The device of claim 15 whereby each said corrosion resistant coating comprises about 60 weight percent of graphite.

17. The device of claim 16 whereby:
    a. said first corrosive fluid comprises a corrosive fluid from the group of corrosive fluids consisting of acids, sulfonic acid $HSO_3$—R, hydrated polyperfluorosulfonic acid polymer, water, oxygen, hydrogen and combinations thereof; and
    b. said second corrosive fluid comprises a corrosive fluid from the group of corrosive fluids consisting of acids, sulfonic acid $HSO_3$—R, hydrated polyperfluorosulfonic acid polymer, water, oxygen, hydrogen and combinations thereof.

18. The device of claim 17 whereby one or more of said channels of said top plate, said first plate, said bottom plate or a combination thereof passes a heat transfer fluid.

19. A device comprising:
    a. a top plate, a first plate and a bottom plate each comprising a metal substrate;
    b. each said metal substrate made of a material comprising stainless steel;
    c. each said metal substrate comprising:
       i. an anchor coating completely coating said metal substrate;
       ii. said anchor coating comprising a bonding means for bonding with said metal substrate;
       iii. said anchor coating completely coated with a corrosion resistant coating whereby said anchor coating is between and connected to said metal substrate and said corrosion resistant coating;
       iv. said anchor coating comprising a bonding means for bonding with said corrosion resistant coating;
       v. said anchor coating comprising [4-[2,2,2-Trifluoro-1-(4-{2-hydroxy-3-[4-(4-(4-oxiranylmethoxy-benzyl)-phenoxy]-propoxy}-phenyl)-1-trifluoromethyl-ethyl]-phenol], and
       vi. said corrosion resistant coating comprising a polymer and a plurality of corrosion resistant particles;
       vii. each said corrosion resistant particles electrically-conductive and having a surface area between about 1-20 $m^2/g$ and a diameter less than about 10 microns;
       viii. one or more channels recessing into said metal substrate;
       ix. each said channel having an interior;
       x. said anchor coating of said metal substrate completely coating said interior of each said channel; and
       xi. said corrosion resistant coating completely coating said anchor coating within said interior of each channel, whereby said anchor coating is between and connected to said interior of each channel and said corrosion resistant coating;
    d. a first fuel cell;
    e. a second fuel cell;
    f. said first fuel cell corrosive to said metal substrate of said first plate;
    g. said second fuel cell corrosive to said metal substrate of said first plate;
    h. said first plate positioned between and connected to said first fuel cell and said second fuel cell;
    i. one or more of said channels of said first plate passing a second corrosive fluid to or from said first fuel cell;
    j. one or more of said channels of said first plate passing a first corrosive fluid to or from said second fuel cell;
    k. one or more of said channels of said top plate passing said first corrosive fluid to or from said first fuel cell;
    l. one or more of said channels of said bottom plate passing said second corrosive fluid to or from said second fuel cell; and
    m. one or more of said channels of said top plate, said first plate, said bottom plate or a combination thereof passing a heat transfer fluid.

* * * * *